Figure 1A:
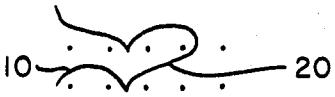
Figure 1A:
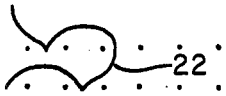
Figure 1A:
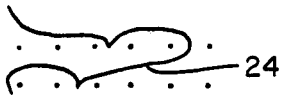
Figure 1A:
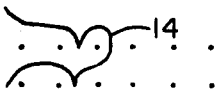
Figure 1A:
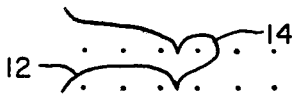
Figure 1A:
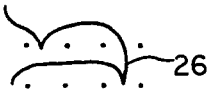
Figure 1A:
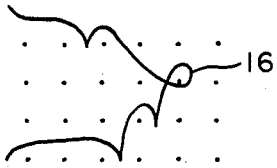
Figure 1B:
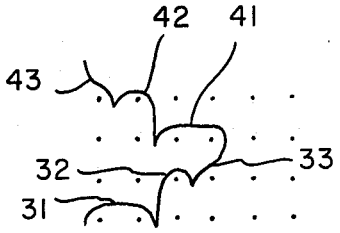
Figure 1B:
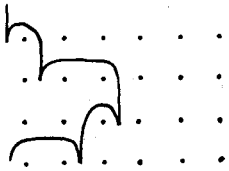
Figure 1B:
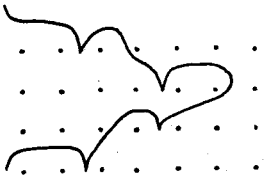
Figure 1B:
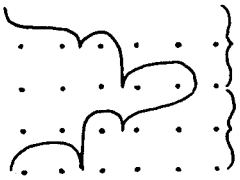
Figure 2:
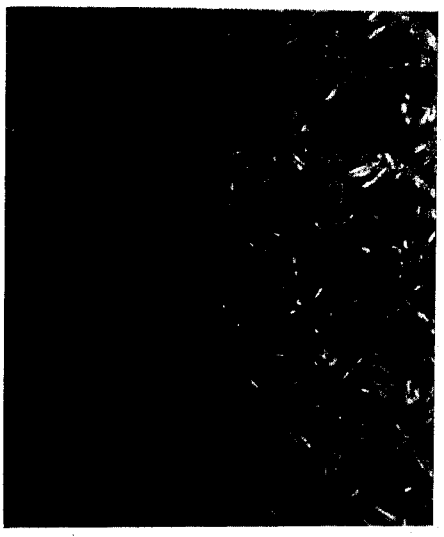
Figure 3:
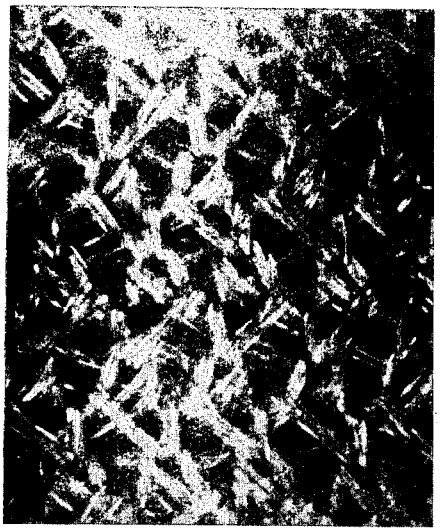
Figure 4:
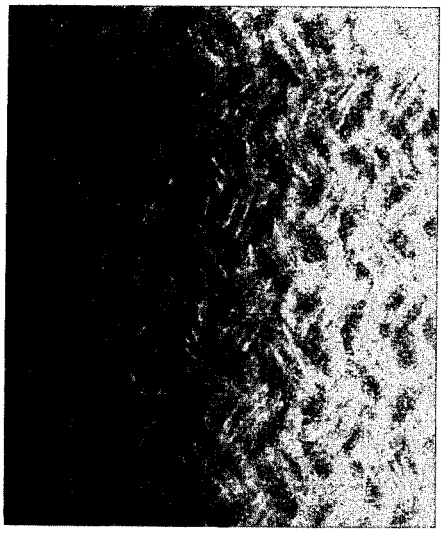
Figure 5:
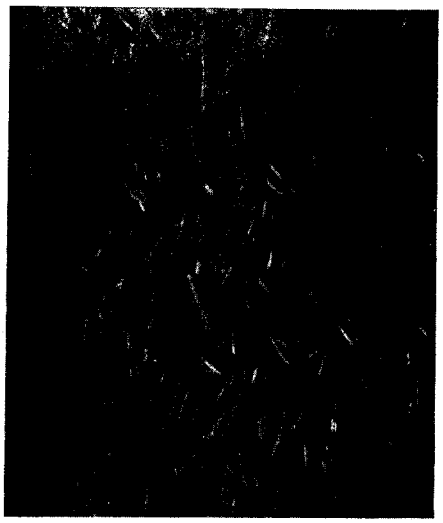
Figure 6:
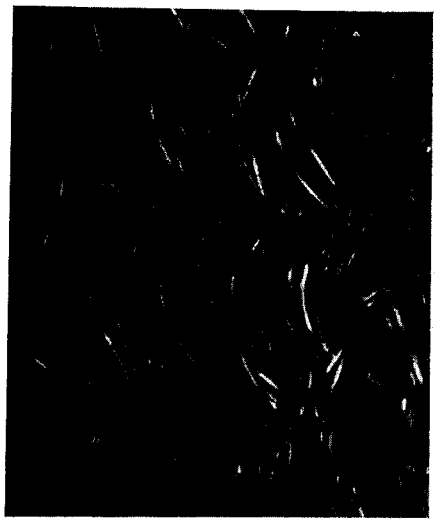

United States Defensive Publication [19] (H) [11] T100,901

Gajjar [43] Aug. 4, 1981

[54] SINGLE-BAR WARP-KNIT FABRICS

[76] Inventor: Bharat J. Gajjar, 1721 Gunning Dr., Forest Hills Park, Wilmington, Del. 19803

[21] Appl. No.: 125,856

[22] Filed: Feb. 29, 1980

[51] Int. Cl.[3] ..... D04B 21/00

[52] U.S. Cl. ..... 66/195

[57] ABSTRACT

A single guide-bar, warp-knit crepe fabric is provided. The fabric has a repeating stitch pattern that includes at least two stitches selected from the group consisting of a three-needle open stitch, a two-needle open stitch and a one-needle open or closed stitch. The floats of the repeat pattern are no longer than four-needle spacings. Four-course repeating patterns are preferred, especially one having a 0-2, 2-3, 4-2, 2-1 repeat.

5 Claims, 4 Sheets Drawing,

18 Pages Specification

The file of this unexamined application may be inspected and copies thereof may be purchased (849 O.G. 1221, Apr. 9, 1968).

8 0-2, 2-3, 4-2, 2-1

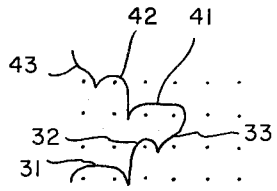

9 0-2, 2-3, 3-1, 1-0

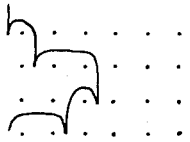

10 0-2, 3-4, 6-4, 3-2

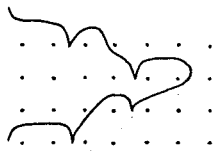

11 0-2, 2-3, 5-3, 3-2 (SIMPLEX)

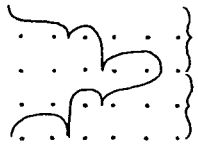

| SAMPLE NO. | STITCH NOTATION | LAP DIAGRAM |
|---|---|---|
| 1 | 0-2, 4-2 (COMPARISON) |   |
| 2 | 0-2, 3-1 (COMPARISON) |   |
| 3 | 0-2, 5-3 (COMPARISON) |   |
| 4 | 0-2, 3-2 |   |
| 5 | 0-3, 4-3 |   |
| 6 | 0-3, 3-1 |   |
| 7 | 0-3, 3-4, 4-5, 3-2 |   |

8 0-2, 2-3, 4-2, 2-1

9 0-2, 2-3, 3-1, 1-0

10 0-2, 3-4, 6-4, 3-2

11 0-2, 2-3, 5-3, 3-2
(SIMPLEX)

SAMPLE 8

SAMPLE 10

SAMPLE 1
(COMPARISON)

SAMPLE II
(FRONT)

SAMPLE II
(BACK)